United States Patent
Hirao (10) Patent No.: US 6,975,737 B2
(45) Date of Patent: Dec. 13, 2005

(54) SPEAKER MOUNTING STRUCTURE OF HEAD REST IN VEHICLE

(75) Inventor: Masakazu Hirao, Niiza (JP)

(73) Assignee: Honda Access Corporation, Saitama (JP)

( * ) Notice: Subject to any disclaimer, the term of this patent is extended or adjusted under 35 U.S.C. 154(b) by 0 days.

(21) Appl. No.: 10/263,345

(22) Filed: Oct. 3, 2002

(65) Prior Publication Data

US 2003/0081795 A1 May 1, 2003

(30) Foreign Application Priority Data

Oct. 5, 2001 (JP) .............................. 2001-309677

(51) Int. Cl.[7] .............................. H04R 5/02; H04B 1/00
(52) U.S. Cl. ..................... 381/302; 381/86; 381/389; 291/217.4; D6/501
(58) Field of Search ................. 381/301, 302, 381/86, 386, 389, 333, 334, 335, 336, 388, 381/395; 297/391, 463.2, 217.1, 217.3, 217.4, 297/217.5, 220; D6/501

(56) References Cited

U.S. PATENT DOCUMENTS

| | | | | |
|---|---|---|---|---|
| 2,908,766 A | * | 10/1959 | Taylor ........................ 381/79 |
| 3,512,605 A | * | 5/1970 | McCorkle ................... 381/301 |
| 4,638,884 A | * | 1/1987 | Lee ............................. 181/141 |
| 4,681,366 A | * | 7/1987 | Lobanoff ................. 297/188.06 |
| D361,674 S | * | 8/1995 | Carter, Sr. ................... D6/364 |
| 5,967,612 A | * | 10/1999 | Takei ......................... 297/391 |
| 6,129,421 A | * | 10/2000 | Gilson et al. ............... 297/408 |
| 6,356,645 B1 | * | 3/2002 | Trenkle ....................... 381/389 |

FOREIGN PATENT DOCUMENTS

| FR | 2764850 | * 12/1998 | ........... B60N 2/48 |
|---|---|---|---|
| JP | 60-35687 | 3/1985 | |
| JP | 61-28468 | 8/1986 | |
| JP | 63-35204 | 2/1988 | |
| JP | 1-59446 | 4/1989 | |
| JP | 1-177950 | 12/1989 | |
| JP | 2-11453 | 1/1990 | |
| JP | 4-78887 | 7/1992 | |
| JP | 4-128654 | 11/1992 | |
| JP | 05-262184 | * 10/1993 | ........... B60R 11/02 |
| JP | 07-281675 | 10/1995 | |
| WO | 94/15815 | * 7/1994 | ........... B60R 11/02 |

* cited by examiner

Primary Examiner—Xu Mei
(74) Attorney, Agent, or Firm—Arent Fox PLLC

(57) ABSTRACT

A speaker mounting structure is provided in a head rest at an upper portion of a seat. A pair of left and right speakers are mounted to the head rest, which has a through-bore at a central portion so the speakers only occupy a lower half of the through-bore.

21 Claims, 9 Drawing Sheets

SPEAKER MOUNTING STRUCTURE OF HEAD REST IN VEHICLE

BACKGROUND OF THE INVENTION

1. Field of the Invention

The present invention relates to an improvement in a speaker mounting structure of a head rest in a vehicle for mounting a pair of left and right speakers to the head rest provided at an upper portion of a seat.

2. Description of the Related Art

A conventional speaker mounting structure of a head rest is already known from, for example, Japanese Utility Model Publication No. 61-28468 and Japanese Utility Model Application Laid-open No. 2-11453.

Figure 9:
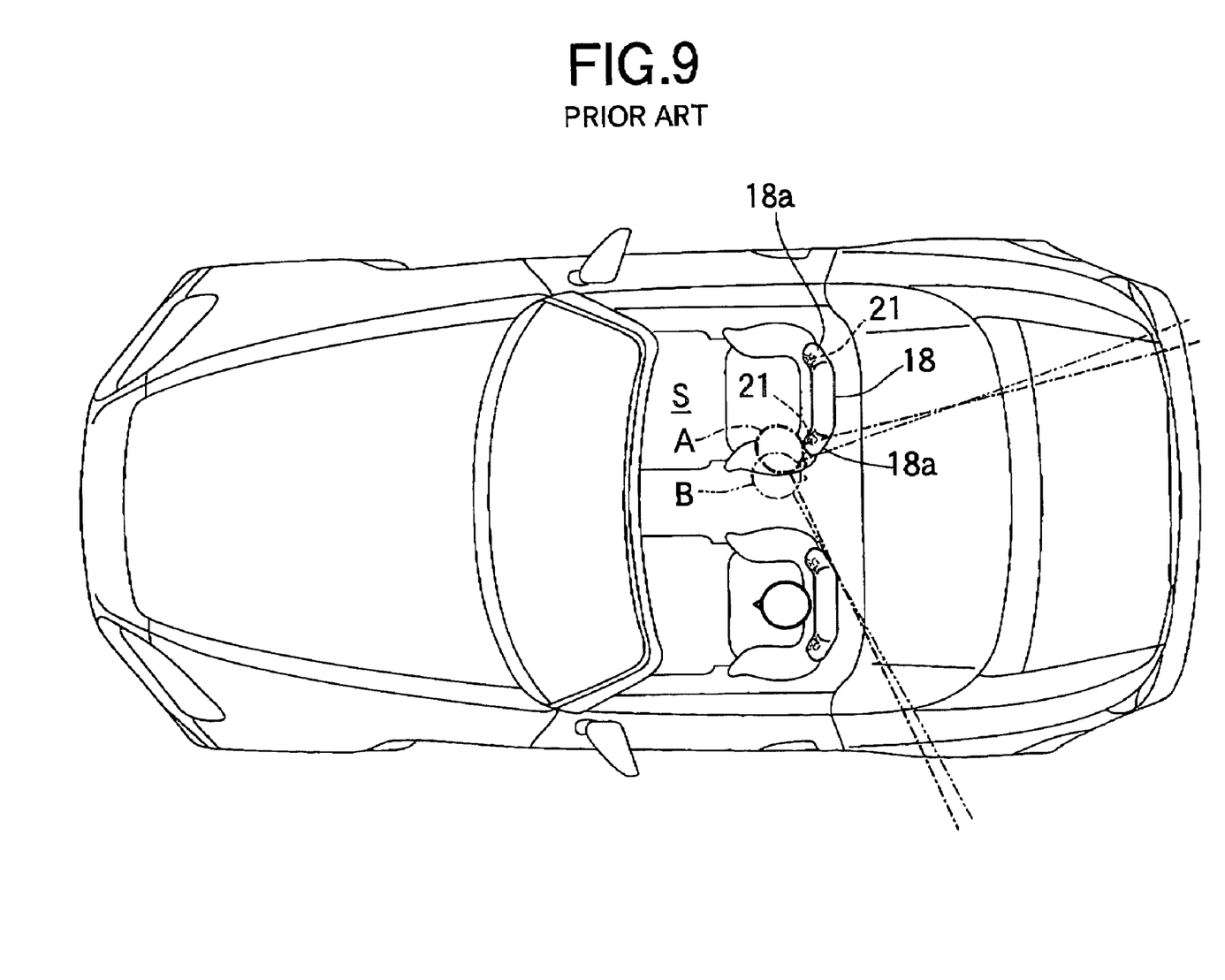
FIG. 9 is a plan view of a vehicle having a conventional speaker mounting structure.

In the conventional speaker mounting structure shown in FIG. 9, overhangs 18a, 18a are provided on opposite sides of a head rest 18 and protrude from the head rest 18 in opposite outward directions. Speakers 21, 21 are mounted to the overhangs 18a, 18a. In the situation where the overhangs 18a on opposite sides of the head rest 18 are omitted, when a driver sitting on a seat S looks back in order to drive the vehicle in reverse, the driver obtains a sufficient rearward view by slightly moving his head from the center of the seat S to a position A. However, in the situation where the overhangs 18a on opposite sides of the head rest 18 are provided, in order to obtain a rearward view that is substantially equivalent to that from the position A, the driver must substantially turn or slide his body and move his head from the center of the seat S to a distant position B in order to look over the overhangs 18a.

SUMMARY OF THE INVENTION

It is an object of the present invention to overcome the above-described deficiencies of the related art.

It is also an object of the present invention to provide a speaker mounting structure of a head rest in a vehicle, wherein the speakers are mounted to the head rest so that a driver does not need to substantially move his body to obtain a sufficient rearward view.

To achieve the above objects, according to a first embodiment of the present invention, there is provided a speaker mounting structure of a head rest in a vehicle for mounting a pair of left and right speakers to the head rest provided at an upper portion of a seat, wherein the pair of left and right speakers are mounted to the head rest having a through-bore at a central portion so that the speakers are arranged to occupy a lower half of the through-bore.

With the above-described arrangement of the first embodiment, the pair of left and right speakers are mounted to the central portion of the head rest. Thus, it is unnecessary to provide conventional overhangs protruding outward from the head rest such that a driver obtains a sufficient rearward view without substantially moving his body since there are no overhangs. Moreover, the upper half of the through-bore provided in the head rest remains open so that the driver recognizes the rearward view through the opened upper half of the through-bore. In other words, although the pair of speakers are mounted to the central portion of the head rest, the rearward view is not obscured or otherwise diminished. Further, the opened upper half of the through-bore provides ventilation and a maximum reduction to air resistance relative to the situation where the through-bore is completely closed.

To achieve the above objects, according to a second embodiment of the present invention, there is provided a speaker mounting structure of a head rest in a vehicle for mounting a pair of left and right speakers to the head rest provided at an upper portion of a seat, wherein the pair of left and right speakers are mounted to a central portion of the head rest so that they are arranged to face forwards in opposite oblique directions.

With the above-described arrangement of the second embodiment, the pair of left and right speakers are mounted to the central portion of the head rest. Thus, it is unnecessary to provide conventional overhangs protruding outward from the head rest such that a driver obtains a sufficient rearward view without substantially moving his body since there are no overhangs. Further, because the pair of speakers face forwards in opposite oblique directions, the diameters of the speakers can be increased while saving space by preventing the width of the head rest from increasing. Also, the sonic field of the speakers is widened such that the sound waves emitted from the speakers spread forward and laterally.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of embodiments shown in the accompanying drawings.

Figure 1:
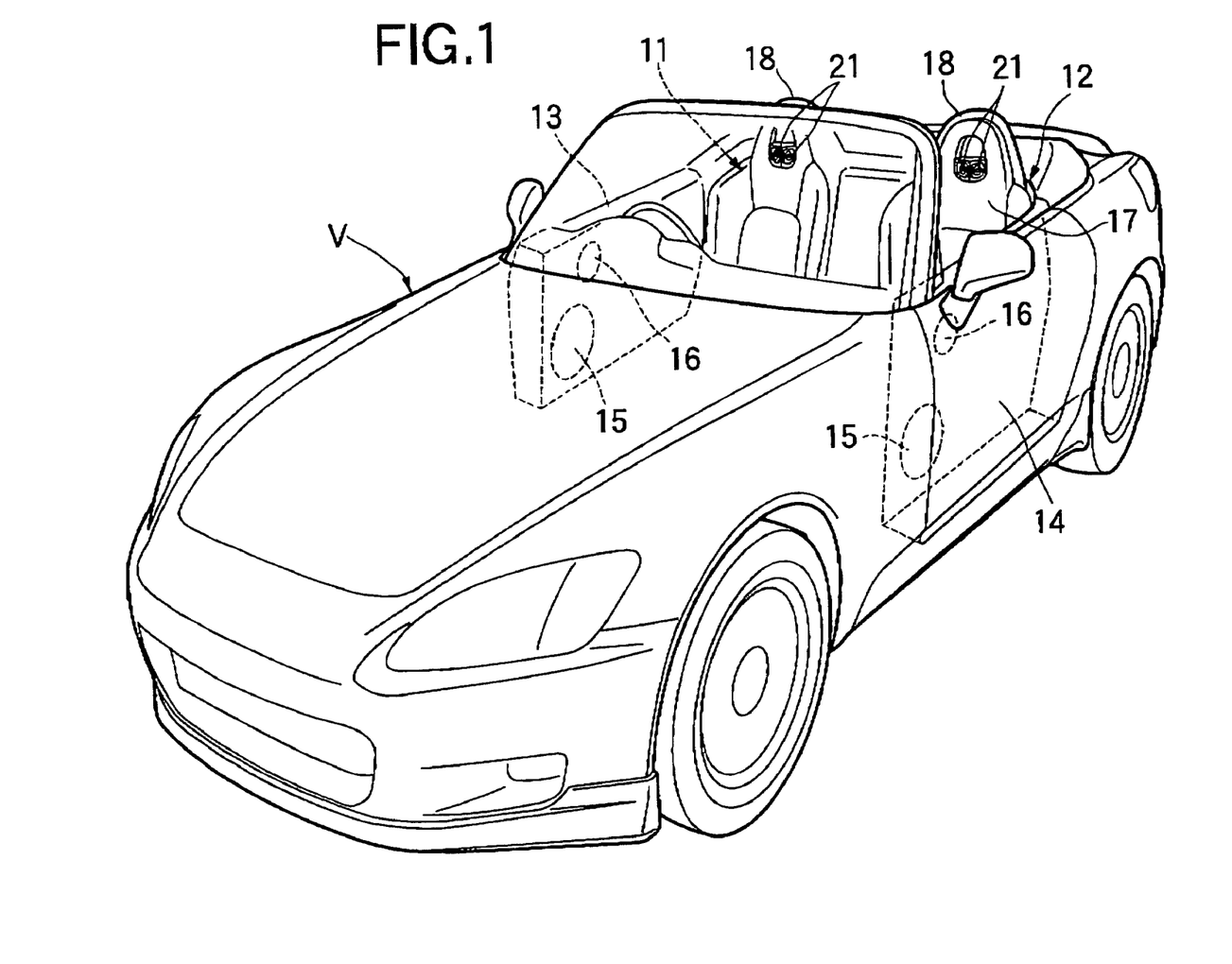
FIG. 1 is a perspective front view of a vehicle having the speaker mounting structure according to the present invention.
Figure 2:
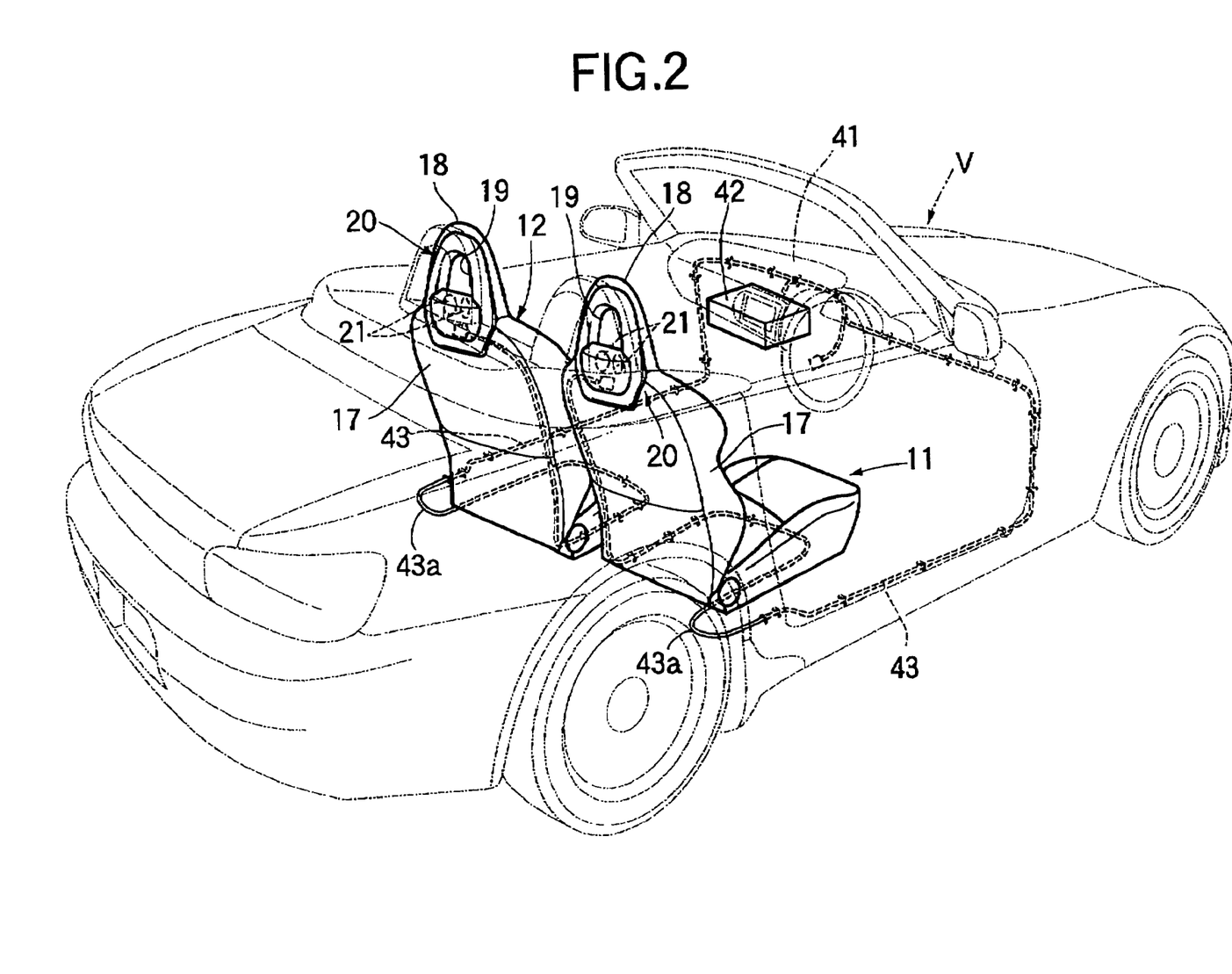
FIG. 2 is a perspective side view of a pair of left and right seats taken through a vehicle body.

Referring to FIGS. 1 and 2, a vehicle V is shown, for example only, as a convertible open-top sports car with two doors, and includes a driver's seat 11 and passenger's seat 12. It should be noted that the vehicle V shown is merely exemplary and that the speaker mounting structure can be implemented in any suitable vehicle. A large-diameter woofer 15 and a small-diameter tweeter 16 are built in each of left and right doors 13 and 14. A pair of speakers 21, 21 are mounted at a central portion of a head rest 18 provided at an upper portion of a back rest 17 of each seat 11 and 12.

Referring to FIGS. 3 to 7, elliptic through-bore 19 has a diameter that is longer in a vertical direction than a diameter in a horizontal direction and is provided in the central portion of each head rest 18. A speaker unit 20 having the pair of left and right speakers 21, 21 is mounted to the head rest 18 from behind after the seat has been assembled in such a manner that the speakers 21, 21 occupy a lower half of the through-bore 19.

In a state in which the speaker unit 20 is not mounted, a head rest cover 22 made of a synthetic resin is detachably mounted on the rear face of the head rest 18. The speaker unit 20 includes the head rest cover 22; a base member 23 made of a synthetic resin and fixed to the head rest cover 22; the pair of left and right speakers 21, 21 mounted to the base member 23; and a decorative member 24 made of a synthetic resin and covering the base member 23 over a portion corresponding to the lower half of the through-bore 19.

A tubular portion 22a includes an elliptic shaped cross section having a diameter that is longer in a vertical direction relative to a diameter in the horizontal direction and is integrally provided at the central portion of the head rest cover 22, to form a portion of the through-bore 19 provided in the central portion of the head rest 18. Clips 25 are secured to a front face of the head rest cover 22 at a plurality of points, e.g., four points, around the tubular portion 22a. The clips 25 are adapted to be detachably inserted into locking portions 26 (see FIG. 3) provided in the rear face of the head rest 18.

Figure 3:
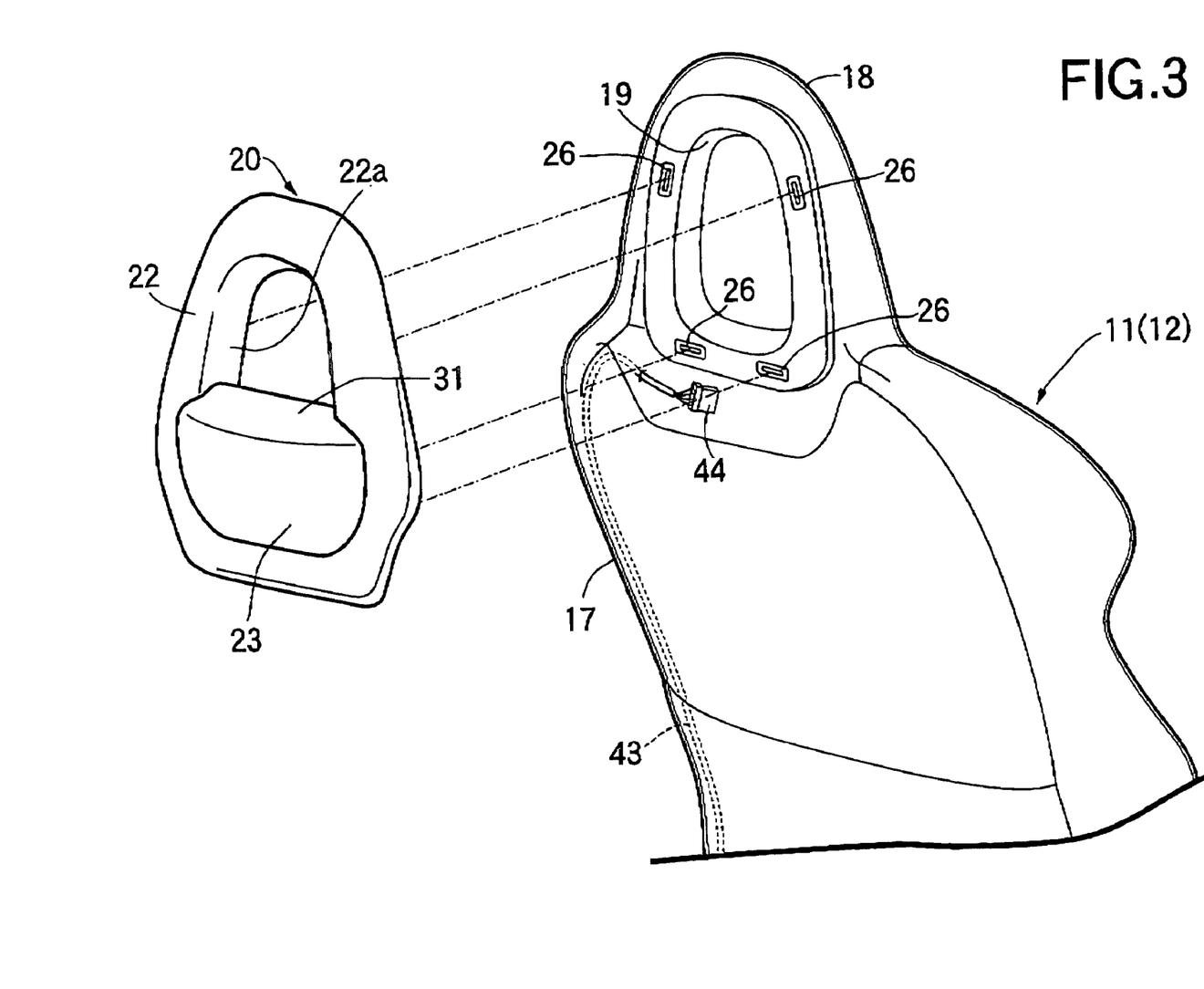
FIG. 3 is an exploded perspective rear view of an upper portion of the seat.
Figure 4:
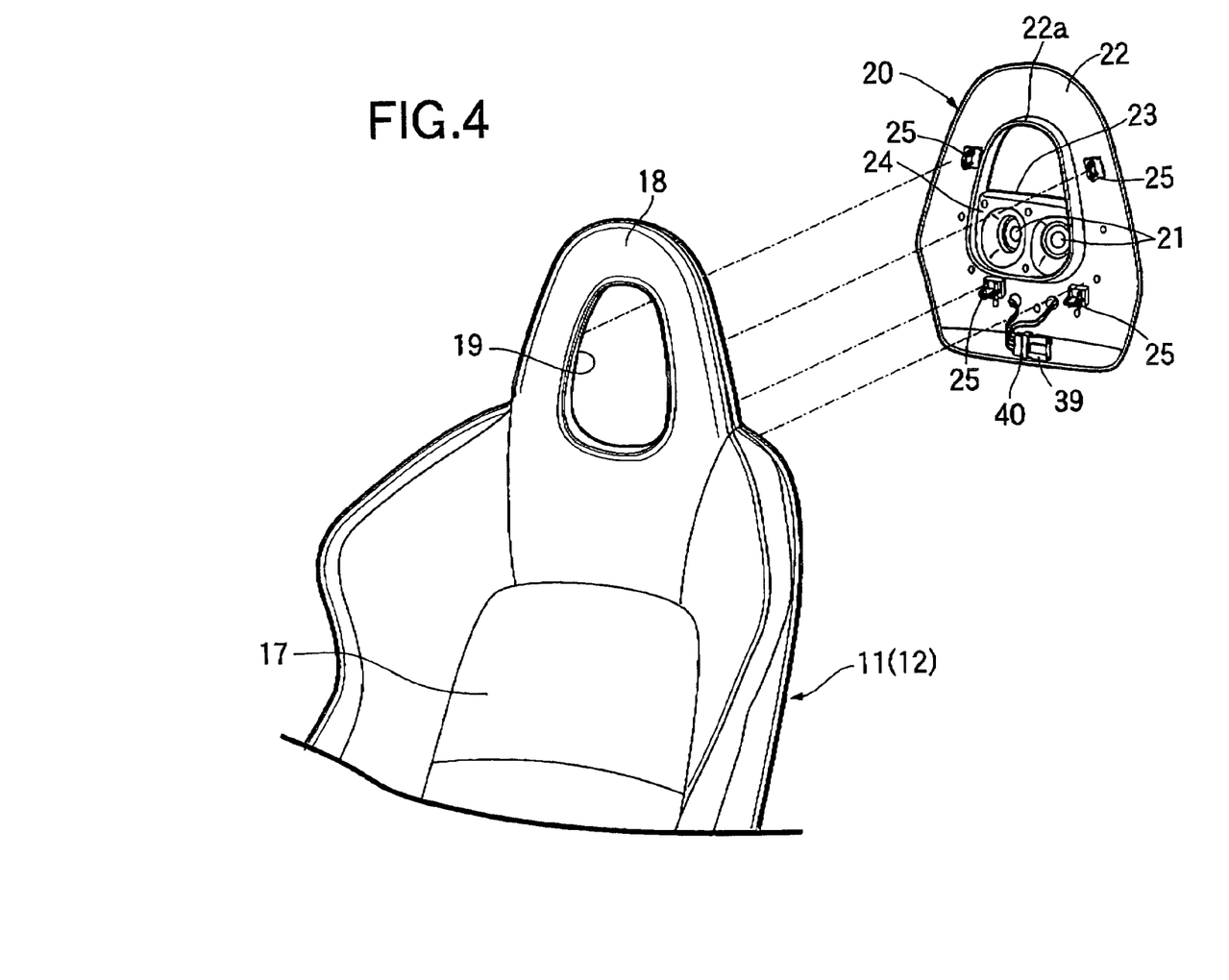
FIG. 4 is an exploded perspective front view of the upper portion of the seat.
Figure 5:
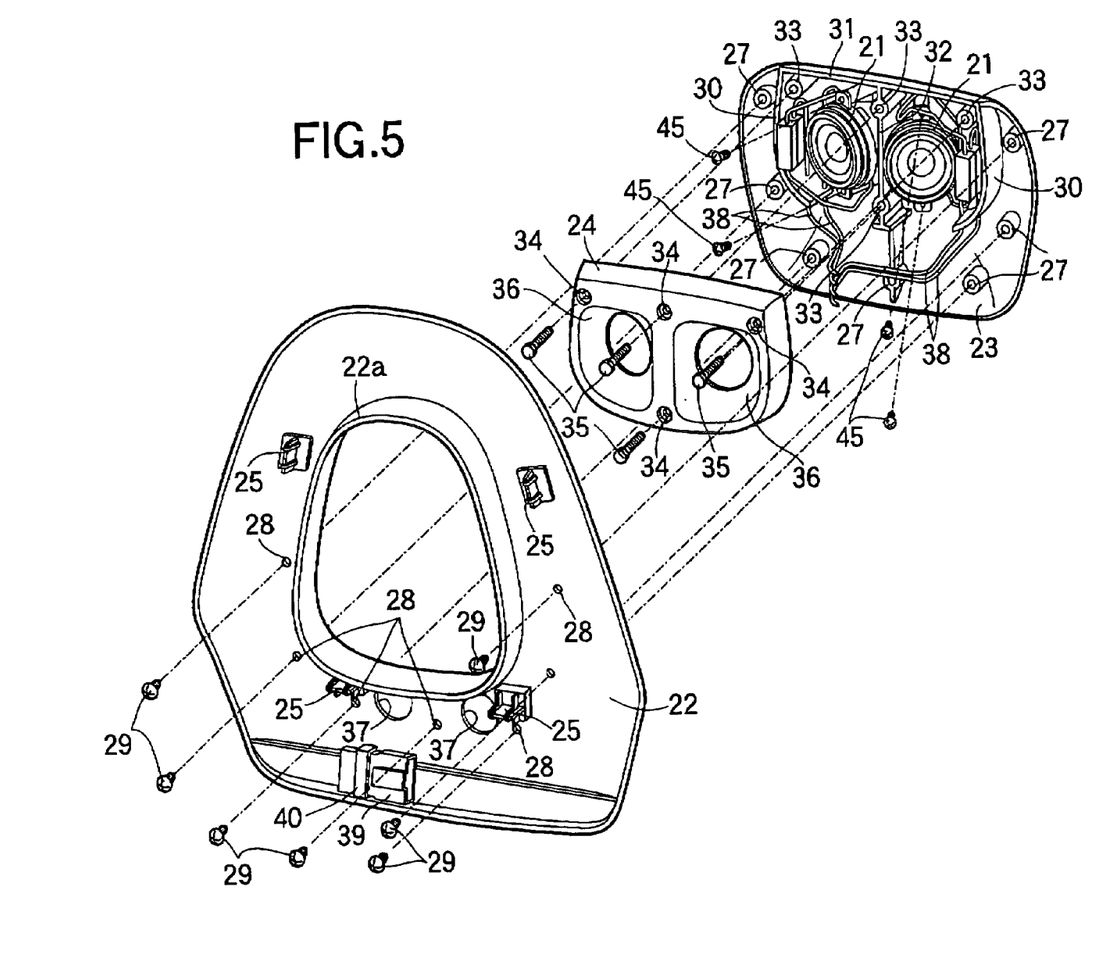
FIG. 5 is an exploded perspective front view of a speaker unit.

The base member 23 is mounted at a lower portion of the rear face of the head rest cover 22. A plurality of, e.g., seven, bosses 27 are integrally and projectingly provided on the base member 23 to abut against the rear face of the head rest cover 22 around a lower portion of the tubular portion 22a. Insertion bores 28 are provided in the head rest cover 22 and correspond to the bosses 27. Thus, the base member 23 is mounted to the lower portion of the rear face of the head rest cover 22 by screwing threaded members 29 inserted through the insertion bores 28 into the bosses 27.

A central upper portion of the base member 23 mounted to the head rest cover 22 closes a lower half of the tubular portion 22a of the head rest cover 22 Integrally and projectingly provided on a front face of the base member 23 in a region corresponding to the lower half of the tubular portion 22a are a pair of sidewalls 30, 30 partially inserted into opposite inner sides of the tubular portion 22a. A connecting wall 31 inserted into the tubular portion 22a connects upper portions of the sidewalls 30, 30 to each other. A partition wall 32 is inserted into the tubular portion 22a such that partition wall 32 extends vertically along an intermediate portion between the sidewalls 30, 30 and an upper end of the partition wall 32 leads at a right angle to the connecting wall 31.

The pair of left and right speakers 21, 21 are mounted to the front face of the base member 23 by two pairs of threaded members 45, respectively, in such a manner that the speakers are disposed in a region surrounded by the sidewalls 30, 30, connecting wall 31, and partition wall 32. In addition, the speakers 21, 21 are mounted to the base member 23 so that they are arranged to face forwards in opposite oblique directions relative to each other.

The decorative member 24 is inserted into the lower half of the tubular portion 22a of the head rest cover 22 and mounted to the base member 23. The peripheral edge of the decorative member 24 abuts against front ends of the sidewalls 30, 30, connecting wall 31, and partition wall 32 on the base member 23

In order to mount the decorative member 24 to the base member 23, a plurality of, e.g., four, bosses 33 are integrally provided on the base member 23 to abut against the rear face of the decorative member 24. Insertion bores 34 are provided in the decorative member 24 in correspondence to the bosses 33. Thus, the decorative member 24 is mounted to the front face of the central upper portion of the base member 23 by screwing threaded members 35 inserted through the insertion bores 34 into the bosses 33.

The tubular portion 22a of the head rest cover 22 is formed to have a diameter that decreases in a forward direction. The decorative member 24 is inserted into the tubular portion 22a so as to be mounted to the base member 23. Therefore, the base member 23 is mounted to the rear face of the head rest cover 22 in a state in which the decorative member 24 is mounted to the base member 23.

Figure 6:
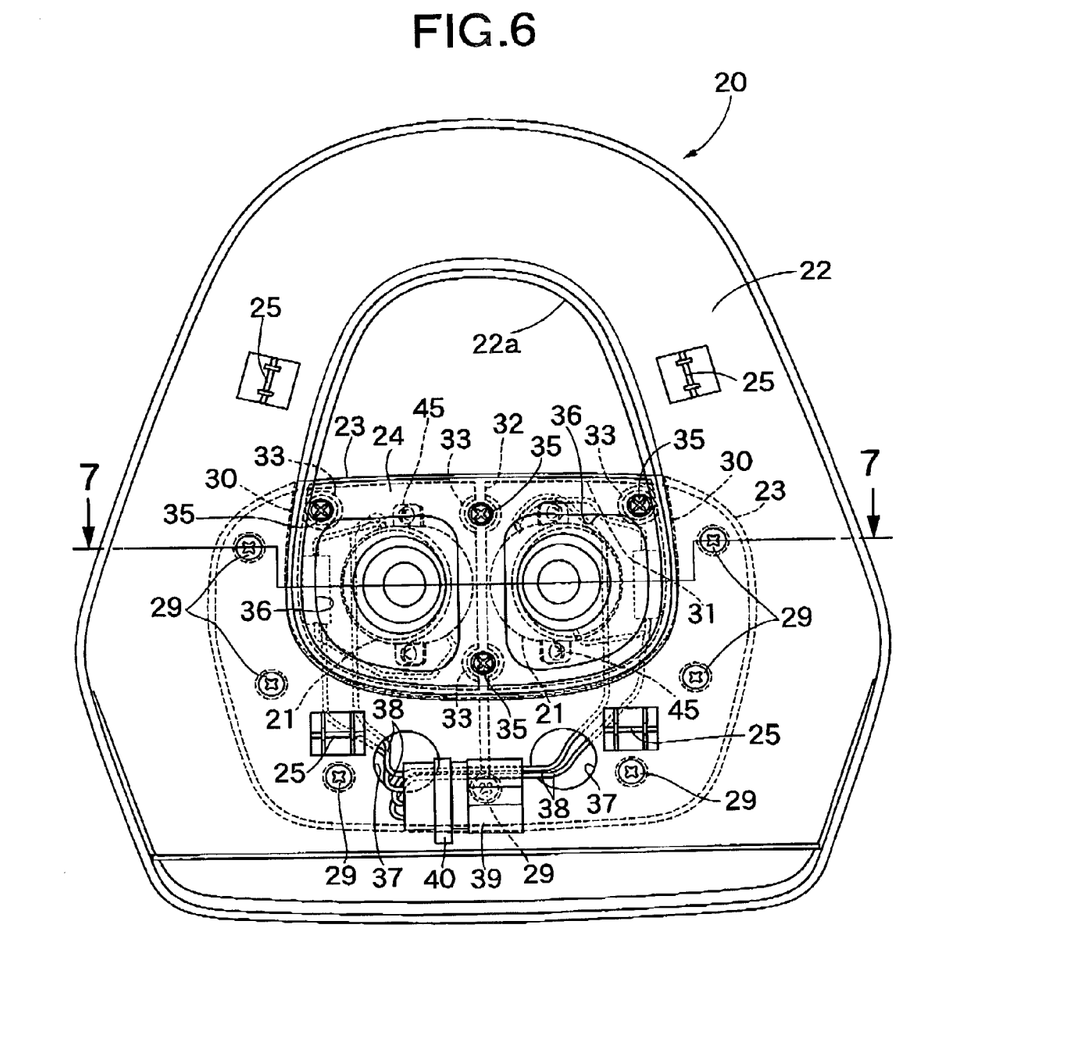
FIG. 6 is a front view of the speaker unit.
Figure 7:
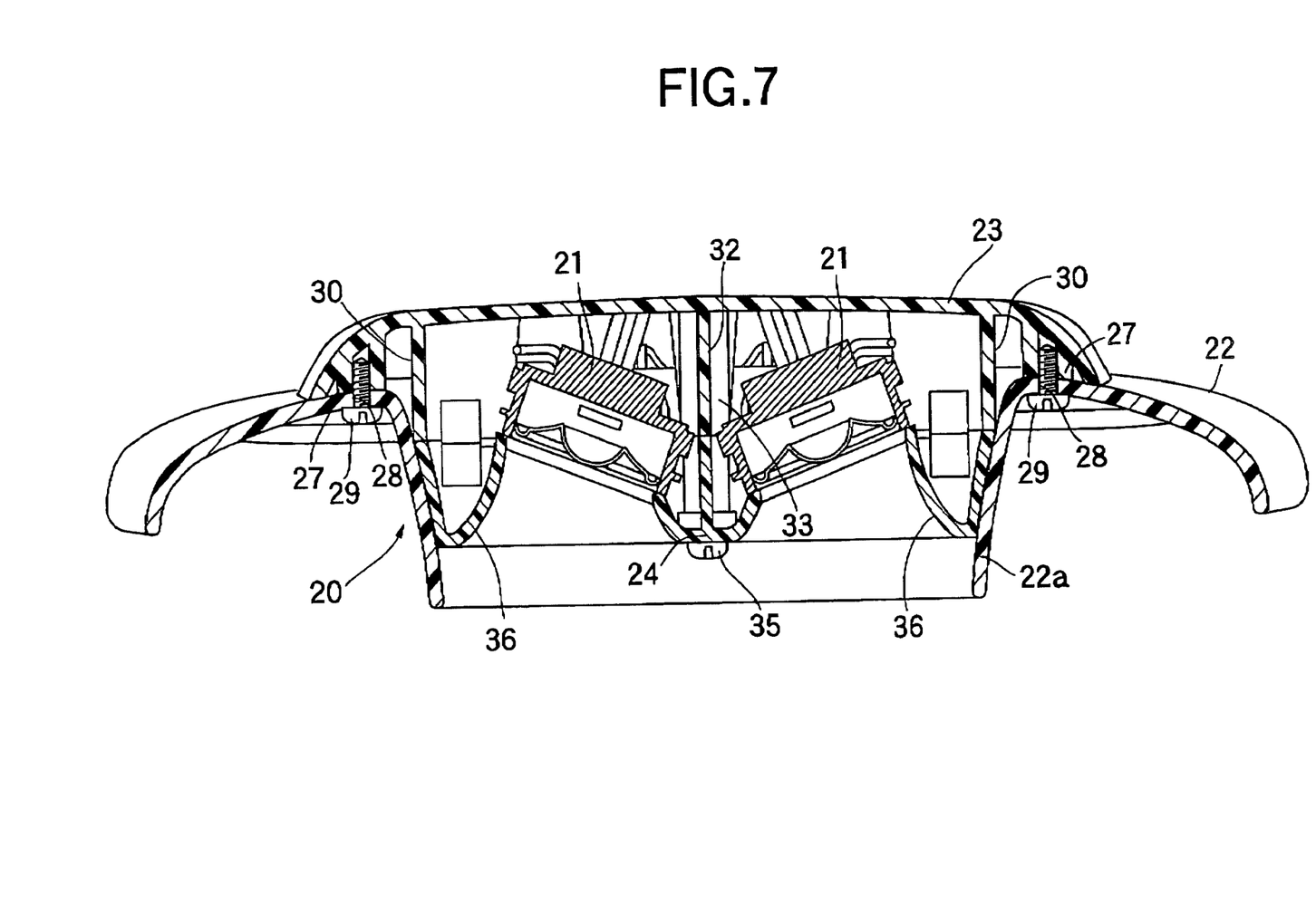
FIG. 7 is a sectional view taken along line 7—7 in FIG. 6.

The decorative member 24 is provided with bugle-shaped openings 36, 36 which face front surfaces of the speakers 21, 21 mounted to the base member 23. Axes of the openings 36, 36 are established to face forwards in opposite oblique directions relative to each other to correspond to the speakers 21, 21, which also face forward in the opposite oblique directions relative to each other.

When the speaker unit 20 is mounted to the head rest 18 from behind, the pair of left and right speakers 21, 21 occupy the lower half of the through-bore 19 in the central portion of the head rest 18 and are arranged to face forward in the opposite oblique directions relative to each other.

A pair of through-bores 37, 37 are provided in the lower portion of the head rest cover 22 in correspondence to the speakers 21, 21, respectively. A pair of electric leads 38 extending from each of the speakers 21, 21 are drawn via the through-bores 37 onto the front face of the head rest cover 22. Moreover, the electric leads 38 are connected to a connector 39 retained on the front face of the head rest cover 22 by a clip 40.

As clearly shown in FIG. 2, an audio set 42 including a tuner, a CD player, an MD player, an amplifier and the like is disposed in an instrument panel 41 at a front portion of a vehicle compartment in the vehicle V so that the operating section faces a front face of the instrument panel 41. Harnesses 43, 43 to be connected to the speakers 21, 21 in the seats 11 and 12 are wired from the audio set 42 to the seats 11 and 12.

Each harness 43 is inserted between a skin and an internal component of a corresponding seat 11 or 12 after assembly of the seats. In particular, the harness 43 inserted between the skin and the internal component from an outer rear portion of a lower portion of each seat 11, 12 is wired to form a forwardly-projecting, substantially U-shape through the lower portion of each seat 11, 12. The harness 43 is then extended to the head rest 18 through an inside rear portion of the back rest 17 of each seat 11, 12. In order to make the wiring of the harness 43 inconspicuous and ensure the fixing of the harness 43 in each of the back rests 17, the harness 43 is disposed between the skin and the internal component to extend vertically in the vicinity of an inside edge of the back rest 17.

Moreover, loosened portions 43a, 43a that absorb the longitudinal movements of the seats 11 and 12 within the vehicle compartment are provided in the intermediate portion of the harnesses 43, 43 between the audio set 42 and the seats 11, 12.

A connector 44 (see FIG. 3) is provided at an end of the harness 43 drawn upwards from the back rest 17 of each seat 11 and 12. The connector 44 is detachably connected to the connector 39 of the speaker unit 20.

The operation of the present embodiment will be described below. The pair of left and right speakers 21, 21 are mounted to the head rest 18 having the through-bore 19 in a central portion and occupy the lower half of the through-bore 19 so that the speakers 21 are mounted to the central portion of the head rest 18. Therefore, the conventional overhangs extending in opposite outward directions from the head rest are not necessary and a driver obtains a sufficient rearward view without having to substantially move his body.

Moreover, the upper half of the through-bore 19 provided in the head rest 18 remains open or unblocked so the driver can recognize the rear view through the opened upper half of the through-bore 19. In other words, although the pair of speakers 21, 21 are mounted to the central portion of the head rest 18, the rear sight is not obscured or otherwise diminished.

Further, the opened or unblocked upper half of the through-bore 19 provides ventilation and a maximum reduction to air resistance relative to the situation where the through-bore is completely closed.

In addition, because the pair of speakers 21, 21 are mounted to the head rest 18 to face forwards in opposite oblique directions relative to each other, the diameters of the speakers 21, 21 are increased while saving space by preventing the width of the head rest 18 from increasing. Also, the sonic field of the speakers is widened such that the sound waves emitted from the speakers 21, 21 spread forward and laterally.

Figure 8:
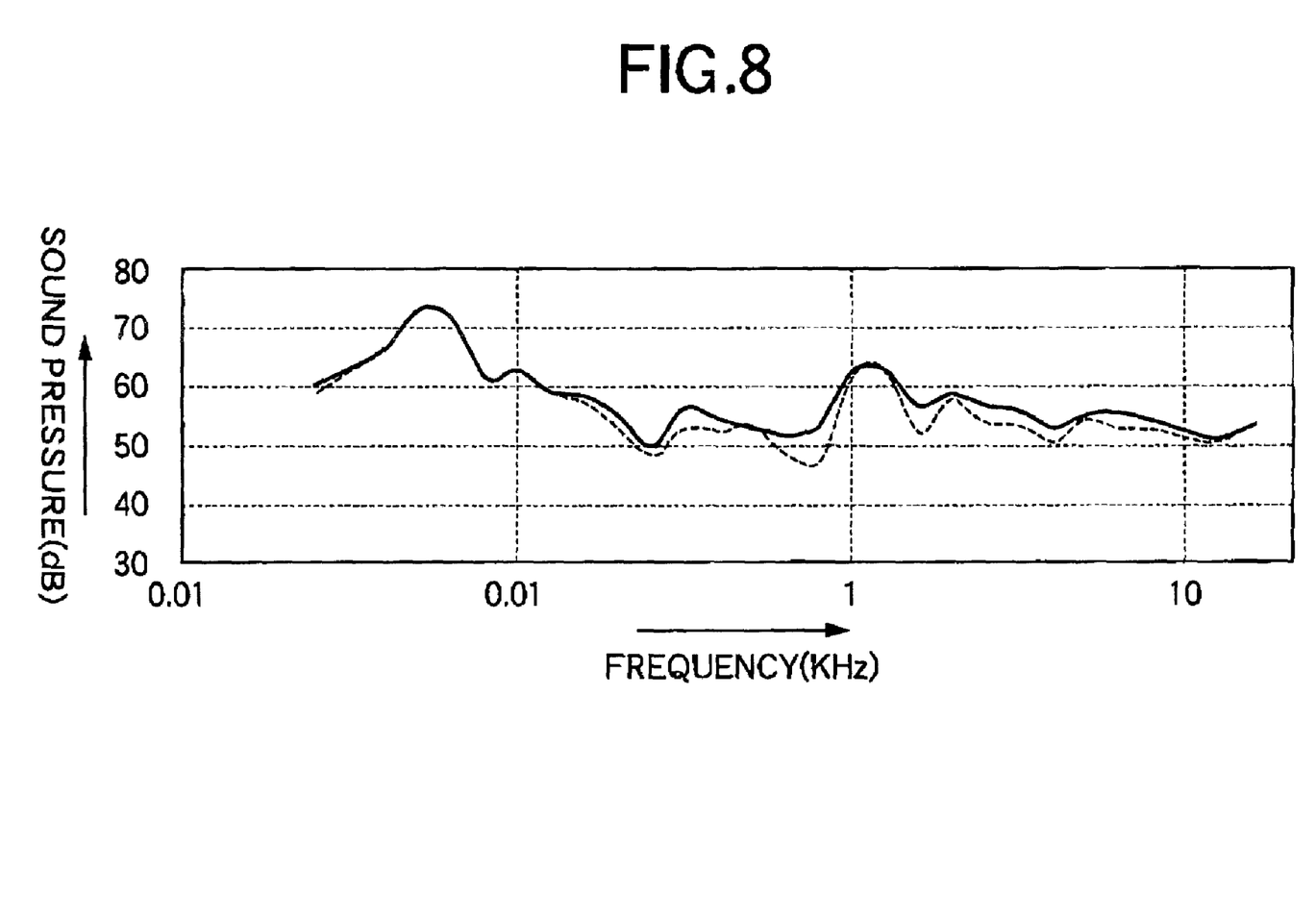
FIG. 8 is a diagram showing frequency characteristics within a vehicle compartment.

As described above, in the mounting structure according to the present invention, the pair of speakers 21, 21 are mounted to the head rest 18 of each seat 11 and 12, in addition to the woofer 15 and the tweeter 16 built in each of the left and right doors 13 and 14. The inventors conducted experiments to confirm that the above-described speaker mounting structure improves the quality of sound within the vehicle compartment. In the experiments, frequency characteristics were measured by a microphone attached to an ear of a dummy doll set on one of the seats 11 and 12. As a result, when only the woofers 15 and the tweeters 16 were built in the left and right doors 13 and 14, a frequency characteristic was obtained as shown by a dotted line in FIG. 8. On the other hand, when the pair of speakers 21, 21 were mounted to the head rests 18 of the seats 11 and 12 in addition to the woofers 15 and the tweeters 16, a frequency characteristic was obtained as shown by a solid line in FIG. 8. The results clearly show that the structure according to the present invention provides flatting effects, particularly in the medium and high sound ranges, to thereby improve the quality of sound.

Although the embodiment of the present invention has been described in detail, it will be understood that the present invention is not limited to the above-described embodiments, and various modifications in design may be made without departing from the spirit and scope of the invention defined in the claims.

What is claimed is:

1. A structure for mounting a pair of left and right speakers to a head rest provided at an upper portion of a seat in a vehicle,
   wherein the head rest includes a through-bore at a central portion thereof, the through-bore extending completely through the head rest from a first surface of the head rest to a second surface of the head rest opposite the first surface, and the pair of left and right speakers are mounted in the through-bore to occupy and entirely block a lower half of the through-bore.

2. The structure according to claim 1, wherein said left and right speakers are disposed to face forward and in opposite outwardly oblique directions relative to each other.

3. The structure according to claim 1, wherein said speakers are mounted to the through-bore of the head rest from a rear side of the head rest.

4. The structure according to claim 1, wherein an upper half of the through-bore is left open to an outside.

5. The structure according to claim 1, wherein the left and right speakers abut each other.

6. The structure according to claim 1, further comprising a base member covering back sides of said left and right speakers and defining a rear space which serves as a speaker box for said left and right speakers.

7. The structure according to claim 6, wherein a lateral width of said base member is greater than a lateral width of the through-bore and equal to or less than a lateral width of the head rest.

8. The structure according to claim 6, wherein the base member is extends downwardly relative from a center point of the through bore, a lower portion of the base member extends over a lower end face of the through hole and partially defines the rear space.

9. The structure according to claim 6, wherein the left and right speakers are located above a horizontally extending center line of the base member.

10. The structure according to claim 6, wherein the left and right speakers are mounted to the base member and the base member is mounted to a rear face of the head rest.

11. A structure for mounting a pair of left and right speakers to a head rest provided at an upper portion of a seat in a vehicle,
    wherein the head rest includes a central portion having a through-bore, the through-bore extending completely through the head rest from a first surface of the head rest to a second surface of the head rest opposite the first surface, and the pair of left and right speakers are mounted in the through-bore of the central portion so as to entirely block a lower half of the through-bore and face forward in opposite oblique directions relative to each other.

12. The structure according to claim 11, wherein said left and right speakers are disposed to face in opposite outwardly oblique directions relative to each other.

13. The structure according to claim 11, wherein said speakers are mounted to the through-bore of the head rest from a rear side of the head rest.

14. The structure according to claim 11, wherein the left and right speakers abut each other.

15. The structure according to claim 11, further comprising a base member covering back sides of said left and right speakers and defining a rear space which serves as a speaker box for said left and right speakers.

16. The structure according to claim 15, wherein a lateral width of the base member is greater than a lateral width of the through-bore and equal to or less than a lateral width of the head rest.

17. The structure according to claim 15, wherein the base member is extends downwardly relative from a center point of the through bore, a lower portion of the base member extends over a lower end face of the through hole and partially defines the rear space.

18. The structure according to claim 15, wherein the left and right speakers are located above a horizontally extending center line of the base member.

19. The structure according to claim 15, wherein the left and right speakers are mounted to the base member and the base member is mounted to a rear face of the head rest.

20. The structure according to claim 1, wherein the first surface is one of either a front surface or a rear surface and the second surface is the other of the front surface and the rear surface.

21. The structure according to claim 11, wherein the first surface is one of either a front surface or a rear surface and the second surface is the other of the front surface and the rear surface.

* * * * *